S. L. BERRY.
BAND SAW GUIDE.
APPLICATION FILED FEB. 14, 1921.

1,438,155.

Patented Dec. 5, 1922.
2 SHEETS—SHEET 1.

WITNESSES.
Anna Berry

INVENTOR.
Seneca Lucien Berry.

S. L. BERRY.
BAND SAW GUIDE.
APPLICATION FILED FEB. 14, 1921.

1,438,155.

Patented Dec. 5, 1922.
2 SHEETS—SHEET 2.

INVENTOR.
Seneca Lucien Berry
BY

ATTORNEYS.

Patented Dec. 5, 1922.

1,438,155

UNITED STATES PATENT OFFICE.

SENECA LUCIEN BERRY, OF SUNNYVALE, CALIFORNIA, ASSIGNOR TO THE BERRY MACHINERY & SUPPLY CO., OF SAN JOSE, CALIFORNIA, A CORPORATION OF CALIFORNIA.

BAND-SAW GUIDE.

Application filed February 14, 1921. Serial No. 444,625.

*To all whom it may concern:*

Be it known that I, SENECA LUCIEN BERRY, a citizen of the United States, residing at Sunnyvale, in the county of Santa Clara and State of California, have invented certain new and useful Improvements in Band-Saw Guides, of which the following is a specification.

My invention relates to the device known as a guide used on band sawing machines to give support to the saw blade; and the object of my invention is to provde a guide which can be reversed, so as to be applicable to either edge of the blade, thus making it feasible to pass material through the machine from the front to the back and vice versa, the reversal of direction being accomplished by a change easily and quickly made. This improved guide is intended to be used as shown and explained in my copending application, of even date, for Letters Patent for improvement in band sawing machines.

The mechanism by means of which this object is attained is fully described hereinafter and shown in the drawings, in which:—

Fig. 1 is an elevation, the view being parallel to the saw blade.

Fig. 2 shows the frame 6 in plan; the guide body 7, the wheel 4 plate 10 and hand wheel 12 in section on the horizontal center line of Fig. 1.

Figure 2:
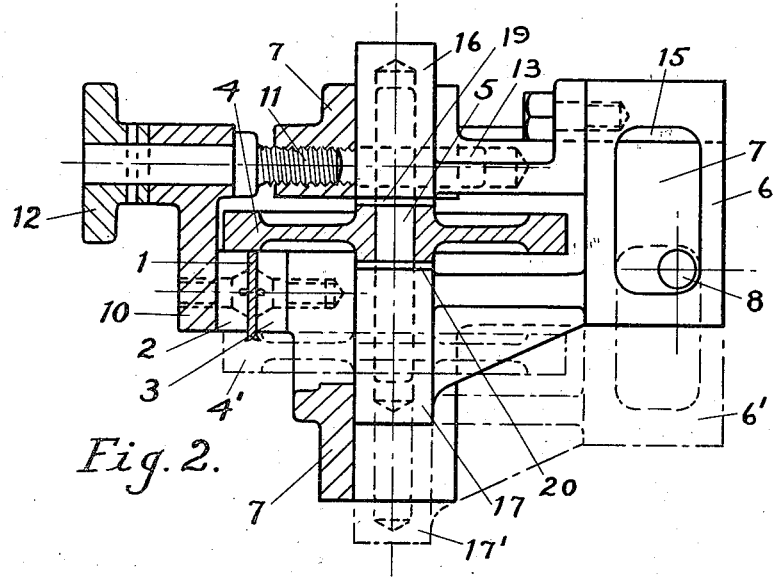
Figure 1:
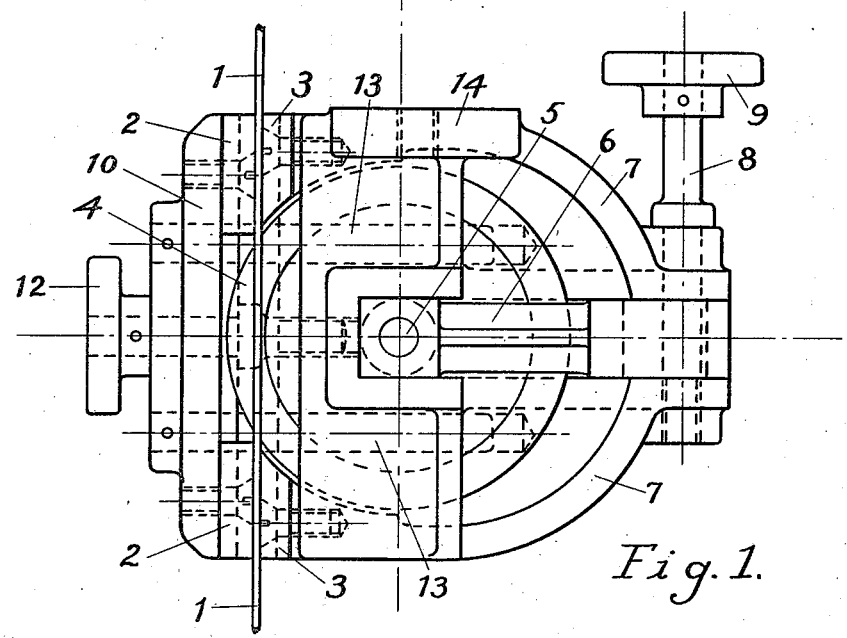
Figure 4:
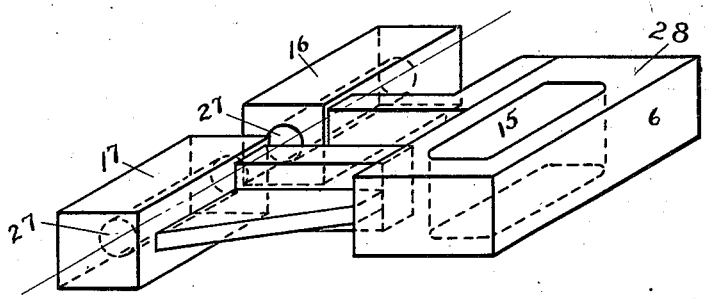
Fig. 4 is a perspective view of frame 6.
Figure 3:
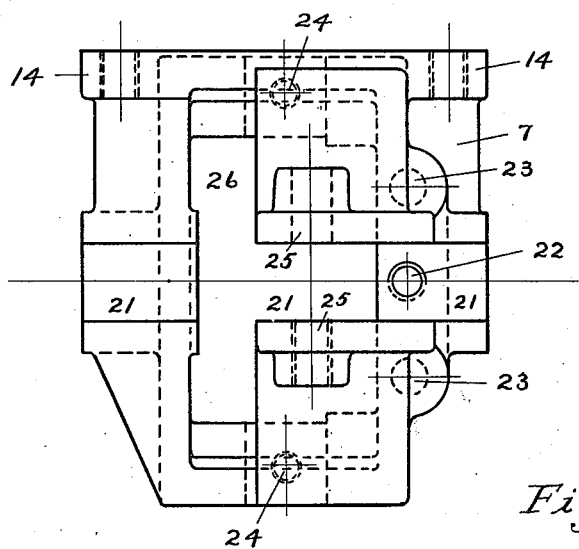
Fig. 3 is an elevation of guide body 7 looking from the right of Fig. 1.

The guide body 7 has, on its upper side, the bracket 14 by means of which it is attached to the band sawing machine; a slotted opening 21—21—21 for the reception of the frame 6; a threaded hole 22 to receive the adjusting screw 11; bored holes 23—23, in which slide the guide rods 13—13; threaded holes 24—24, to receive screws holding the inner saw guides 3—3; and holes 25—25 to receive clamp screw 8. Within the body 7 is the space 26 of proper size and shape to permit the back guide wheel 4 to be moved at right angles to the plane of the saw blade 1 and parallel to the same, for positioning said wheel 4 on either side of blade 1. Secured to body 7, by means of screws, are the fixed inner guides 3—3, while the adjustable outer guides 2—2 are similarly secured to the plate 10, which is supported by the rods 13—13 sliding in holes 23—23 in body 7, and adjustable by means of the hand wheel 12 and screw 11 operating in threaded hole 22 in body 7. The back guide wheel 4 is mounted on spindle 5 which revolves in alined holes 27—27 in bearings 16—17 forming part of frame 6. To take the thrust of the saw blade on either side of the guide wheel 4 I have provided thrust washers 19—20 between said wheel 4 and said bearings 16—17.

Frame 6 is fitted to and is slidable in the slot 21—21—21 in body 7. At its extremities are placed the bearings 16—17 with alined holes 27—27 for the reception of spindle 5, while movement around the clamp screw 8 is provided for by the rectangular opening 15 formed in the connecting part 28 of said frame 6. The frame 6 is shown as made in two parts, the one containing bearing 16 being bolted to the other, for convenience in inserting guide wheel 4 after it has been secured to spindle 5.

The use of side guides 2—2 and 3—3 for holding the blade 1 in sidewise position is old in the art, as is also the use of the back guide wheel 4 in the single position shown by the solid lines in Fig. 2. But I have found a great need for an extension in its range of usefulness, and will now explain the manner in which this need has been met. In the guides of this character heretofore constructed, the guide wheel 4 has been limited to one position in relation to the saw blade, having a spindle bearing on one side only, and having merely a small amount of adjustment to accommodate saw blades of different widths. They have been in no sense reversible. In Fig. 2 is shown in solid lines what may be called the direct position of the guide wheel 4, while the dotted lines show the reversed position.

The wheel 4 is secured to spindle 5 carried by bearings 16—17 in frame 6, said frame being slidably mounted in a slot formed in the guide body 7, and so arranged as to permit adjustment parallel to the plane of the blade 1 and sufficient motion at right angle thereto to allow the edge of the wheel 4 to clear the gap between side guides 2—2 and 3—3. When the frame 6 is in its proper position it is held by being clamped by the screw 8. The object of this construction is to permit the saw blade to be positioned with its teeth looking outwardly, as shown in Fig. 2, and to be reversed, so as to have its teeth looking inwardly. With the parts in the direct position, as shown by the solid lines in Fig. 2, the method of changing to the reversed position is as follows; loosen screw 8, slide frame 6 with wheel 4 at right angle to the plane of the saw blade 1, remove blade from the machine, turn it inside out, replace with its teeth looking inwardly, slide frame 6 parallel to the plane of the blade and out to position with the wheel 4 behind the blade, as shown at 4'; clamp by means of the screw 8. The side guides 2—2 are moved out enough to permit the passage of the saw teeth, which are generally wider than the blade itself. This movement is accomplished by the screw 11. The use of washers and bearings on both sides of the wheel 4 is one method of permitting it to take thrust in both directions.

What I claim is:—

1. In a band saw guide, the combination with fixed and adjustable side guides of a back guide wheel slidably mounted to permit positioning on either edge of saw blade.

2. A band saw guide comprising the combination with a guide body carrying fixed side guides and adjustable side guides, of a frame having alined bearings for both ends of a spindle, a back guide disk having a through spindle and a washer interposed between each of said bearings and the back guide disk; said frame being adjustable to locate the back guide disk either in front or behind the side guides.

3. A band saw guide comprising side guides and a back guide mounted to resist thrust in either direction, and adjustable interchangeably to close the passage between the side guides in either direction.

SENECA LUCIEN BERRY.

Witnesses:
 ANNA BERRY,
 IDA TRUBSCHENCK.